United States Patent [19]

Newell et al.

[11] Patent Number: 4,632,494
[45] Date of Patent: Dec. 30, 1986

[54] LINEAR MOVING IRRIGATING APPARATUS

[75] Inventors: Stephen D. Newell; Stephen B. Rowe, both of DuBois; John M. Bukousky, Sykesville, all of Pa.

[73] Assignee: Alco Industries, Inc., Valley Forge, Pa.

[21] Appl. No.: 840,539

[22] Filed: Mar. 17, 1986

Related U.S. Application Data

[63] Continuation of Ser. No. 392,645, Jun. 28, 1982, abandoned.

[51] Int. Cl.⁴ .............................................. B05B 3/18
[52] U.S. Cl. ..................................... 239/184; 74/151; 239/744; 239/739; 239/741; 239/737; 239/750
[58] Field of Search .............. 239/178, 184, 186, 188, 239/189, 190, 191, 709, 713–716, 720, 721; 74/151, 152

[56] References Cited

U.S. PATENT DOCUMENTS

| | | | |
|---|---|---|---|
| 2,699,337 | 1/1955 | Best | 74/151 |
| 2,730,403 | 1/1956 | Huntley | 239/716 |
| 3,059,488 | 10/1962 | Daubenberger | 74/152 |
| 3,628,731 | 12/1971 | Phillips | 239/191 |
| 3,848,625 | 11/1974 | Courtright | 239/184 |
| 4,036,436 | 7/1977 | Standal | 239/186 |
| 4,142,547 | 3/1979 | Courtright | 239/716 |
| 4,192,340 | 3/1980 | Courtright | 239/716 |
| 4,240,584 | 12/1980 | Courtright | 239/189 |
| 4,248,382 | 2/1981 | Moore | 239/189 |
| 4,260,109 | 4/1981 | Courtright | 239/720 |
| 4,277,028 | 7/1981 | Olson | 239/716 |
| 4,284,240 | 8/1981 | Courtright et al. | 239/716 |
| 4,350,295 | 9/1982 | Gheen | 239/721 |

Primary Examiner—Joseph F. Peters, Jr.
Assistant Examiner—Michael J. Forman
Attorney, Agent, or Firm—Parmelee, Miller, Welsh & Kratz

[57] ABSTRACT

A self-propelled, linear-forwardly, relatively slow-moving irrigating apparatus has a main frame and master drive unit carrying a rotating, water-supplying, pipe-like, axle shaft that provides a side-extending wheel-line along which are spaced what may be termed power, booster and wheeled spray units that enable a large area of ground crop to be irrigated at one time. Longitudinally spaced-apart hydrants are provided along the length of the field that is to be irrigated to detachably receive a flexible water-supplying hose that is also detachably carried by the main frame. The apparatus has automatic means for maintaining the main frame and the wheel-line in an aligned forwardly advancing relation, for stopping forward movement when a serious obstruction is encountered and when the desired full extent of its advance along a side-extending anchored guide cable has been attained. Combustion engine and coupling means is provided for the main frame and a wheel-line power unit to drive the apparatus backwardly towards its starting position without the need for auxiliary drag-back tractor or other equipment.

15 Claims, 16 Drawing Figures

LINEAR MOVING IRRIGATING APPARATUS

This is a continuation of co-pending application Ser. No. 392,645 filed on June 28, 1982, now abandoned.

FIELD OF THE INVENTION

This invention pertains to an irrigating apparatus for linear movement along a field crop to effectively cover a maximum area thereof in a progressive, slowly advancing type of sprinkling operation in which the apparatus is self-energized in both its forwardly advancing sprinkling operation and in a reverse-return type of operation. A further aspect deals with operative features of the apparatus that enable it to function in a foolproof and positive manner, with a minimum of manual control and auxiliary equipment.

DESCRIPTION OF THE PRIOR ART AND PROBLEMS INVOLVED

Heretofore, there have been both rotary and linear types of field area irrigating equipment, but the present invention pertains particularly to a linear type and to problems which have heretofore been presented from the standpoint of presently known prior art apparatus. One characteristic of the prior art apparatus is that use has been made of hydraulic jack actuation in which the upper or forward movement of the piston rod of the jack represents the only positive actuation thereof and as employed to advance the equipment. The disadvantage of constructions of this type has been that the return of the piston and its rod is non-positive, in that it depends primarily on gravity and weight considerations, and this has given rise to various adverse factors, such as a total stoppage of return due to dirt or mud thrown up from the field, or uncertain and uneven movement due to frictional resistance encountered by the piston within its housings, etc.

A further problem encountered in the prior art equipment has been the lack of full coordination between the drive of the main frame unit and the movement and drive of the wheel-line, side-extending portion of the apparatus, such as may be caused by the different nature and contour of the field transversely thereof as encountered by the apparatus, by an actual obstruction encountered, such as a stone or mound of dirt, all of which tend to present problems of misalignment or a tendency to bend or break wheel-line portions of the apparatus or to damage the equipment when an excess torque is engendered. The need has been for an apparatus that will give a maximum coverage in its forward linear advance, for example, about a quarter of a mile of field width, and which will do so without entailing any damage to the apparatus due to obstructions, stoppage, irregular contours or other factors that are encountered during forward movement.

The need has been for a substantially fully coordinated and automated type of operation, such that stoppage of wheel-line drive may be effected when torque resistance above a present value is reached. Also, simplified self-aligning means should be provided that will enable the advance of the main frame to be slowed down, speeded up or stopped to coordinate its movement with that of the wheel-line.

Another problem, as previously presented, has been the difficulty of returning apparatus, and especially apparatus having a considerable length of wheel-line, to an initial or starting position, once it has reached the end of its desired forward travel. In this connection, it has heretofore been necessary to utilize a heavy tractor, truck or other power equipment which tends to sink into the wet soil and cause excessive damage to the growing crops, and which increase costs from the standpoint of man hours and excessive auxiliary equipment required.

OBJECTS OF THE INVENTION

It has thus been an object of the invention to determine and evaluate the adverse factors that heretofore have been encountered in connection with the utilization of wide coverage, linear irrigating apparatus.

Another object has been to devise linear moving irrigating apparatus which meets the adverse factors and which enables a solution to problems encountered in the design and use of prior art construction.

A further object of the invention has been to devise an irrigating apparatus for effectively wetting a large crop planted field or area, and whose relatively slow speed can be accurately adjusted and set to accommodate an efficient, full forward irrigating action, and that is so constructed as to enable automatic alignment adjustment and protection from damage by reason of irregular ground contour or the presence of an equipment damaging type of obstruction.

A still further object has been to devise a linear irrigating apparatus that may be both positively hydraulically advanced in a sprinkling operation, and that may then be self-operated in a reverse or return direction with a minimal or changeover involved and with minimal damage to the crop area.

These and other objects of the invention will appear to those skilled in the art from the illustrated embodiment and the claims.

BRIEF DESCRIPTION

The illustrated embodiment utilizes a main frame that carries a lateral or side-extending wheel-line on a hollow, water-supplying, pipe-like shaft member that serves as a drive shaft and wheel axle for moving the apparatus in both forwardly advancing and retracting directions. The shaft serves to supply water under pressure to spray heads at spaced locations along the wheel-line; it utilizes spaced-apart supporting wheels and booster and power units that supplement movement that is effected by a positively reciprocated hydraulic jack on the main frame. A power unit carried midway of the wheel-line also cooperates with the master drive unit of the main frame in returning the apparatus to a starting area. Power units of the apparatus employ hydraulic jacks, stroking arms and bull gears for effecting forward movement and have adjustment means between the stroking arms and teeth of cooperating bull gears for selecting the number of teeth that will be engaged during each upward stroke of the jacks.

The main frame unit utilizes a self-aligning means that is controlled in its operation by the relationship between a drive reel or capstan and a reeved guide cable which is to be anchored at its ends to extend along a full forward length of the field to be covered.

Side-positioned booster drive and power units are each provided with torque-sensitive valve means that will slow down and stop the drive stroking movement of their associated jacks when an obstruction is encountered. The main frame as well as an intermediate power drive unit are provided with combustion engines for driving the equipment in a coordinated return direction after a flexible supply hose has been disconnected from a water supply hydrant at its one end and its other end has been connected in a dragging return relation to the then back end of the returning main frame.

BRIEF DESCRIPTION OF THE DRAWINGS

FIG. 2 is a perspective view in elevation showing a main or master drive unit and its mounting on a longitudinally extending main frame; it also shows a hollow, water-carrying rotating axle shaft which, in effect, defines a side or laterally extending wheel-line;

FIG. 4 is a side section on the scale of and taken along the line XIV—XIV of FIG. 13;

And, FIG. 15 is a side section in partial section on the same scale as FIG. 14 showing how the axle shaft is supplied with water from the short length connecting hose illustrated in FIG. 2.

DETAILED DESCRIPTION

Figure 1:
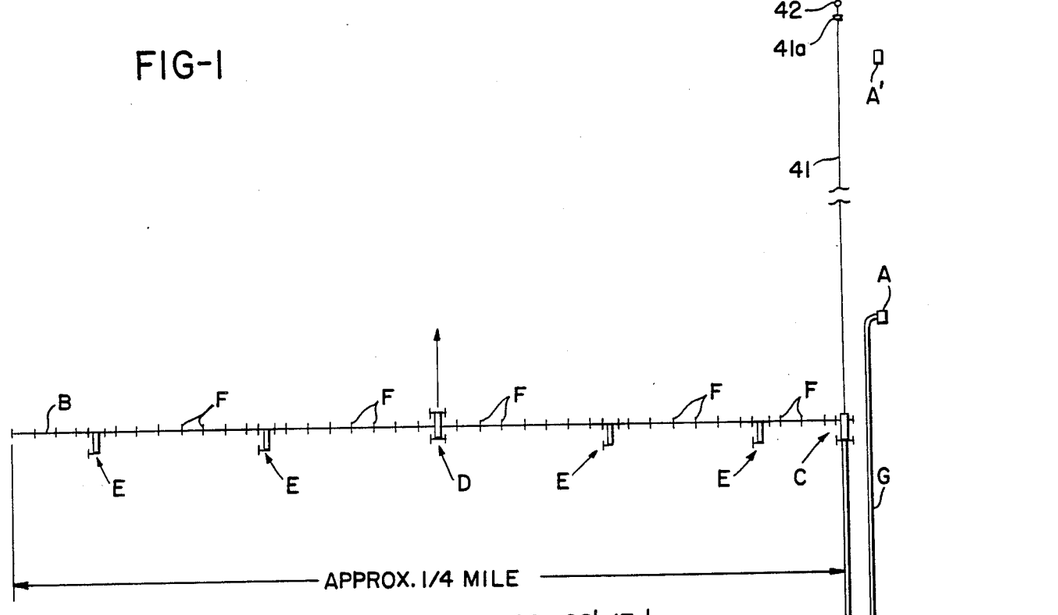
FIG. 1 is a greatly reduced somewhat diagrammatic plan view illustrating apparatus of the invention in a typical forwardly advancing, crop irrigating layout.

In FIG. 1 of the drawings, an apparatus of the invention is somewhat diagrammatically illustrated. In this layout, A and A' represent a group or series of spaced-apart hydrants whose intermediate spacing approximates a distance representing twice the length of a flexible hose G which is to be detachably utilized therewith for supplying water under pressure to the apparatus. As indicated, the irrigating apparatus is adapted to advance forwardly lengthwise in a direction along a field or crop area between two locations that are represented by ground anchors 42, 43 between which the guide cable 41 is adapted to extend. It will be noted that the back end of the cable 41 is secured to the anchor 43 through the agency of a heavy spring 44 which serves to provide it with a flexible, non-breakable mounting.

The apparatus proper employs a master drive unit C that is represented by a main frame 10 (see FIG. 2) from which extends a rotating, pipe-like water-carrying axle shaft 17 that serves as a conduit to supply water under pressure along its length to sprinkling units 93 (see FIGS. 2, 3, 4, 13 and 14). The shaft 17 defines a side or laterally extending wheel-line B that is supported at spaced locations along its length by wheels F that are keyed thereon. Also, a mid-located power mover unit D and lengthwise-space booster units E are shown as completing the wheel-line construction.

Figure 5:
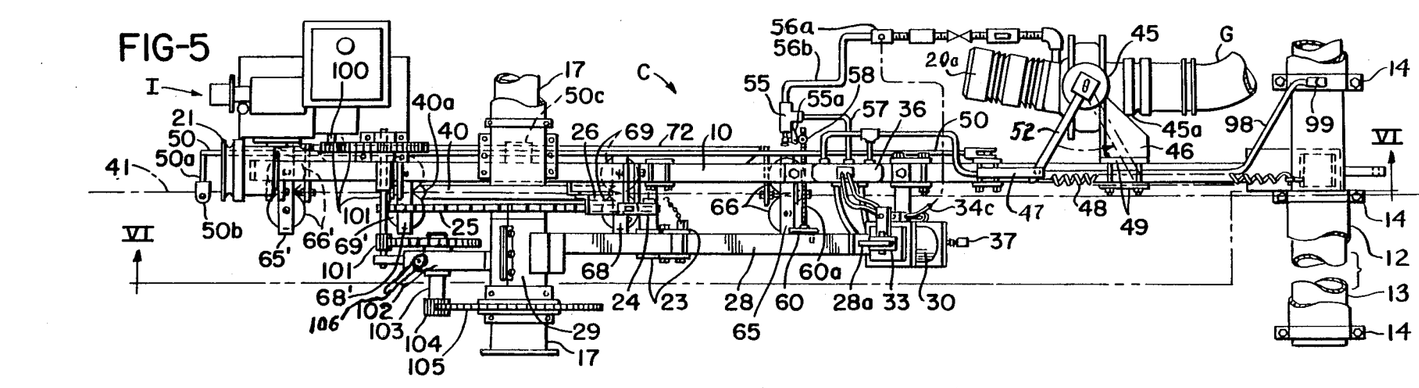
FIG. 5 is a slightly enlarged fragmental plan view of the master drive unit apparatus of FIG. 2 which particularly shows its self-alignment system, a rearwardly-positioned automatic, shut-off valve mechanism, and a forwardly-positioned combustion engine drive which is utilized to return the apparatus to its starting area or position.

Forward movement of the construction is accomplished in a substantially automatic manner by a four wheel master drive unit C, four wheel power unit D, and two wheel booster units E, all as driven by reciprocating hydraulic jacks 30, 30' and 30''. The maximum or final forward position of the apparatus is controlled by a stop element of trip clamp 41a (see FIGS. 6 and 12) that is to be clamped on the cable 41 to trip a lever mechanism shown in FIG. 12 of the drawings to completely shut-off the supply of water to the apparatus at the end of its forward movement through the agency of a main shut-off valve 45. As shown in FIG. 5, the valve 45 is mounted on frame 10 by an upwardly extending bracket 46. Suitable rotatable spray head assemblies (see FIGS. 13 and 14) apply water to the crop rows during the forward advance of the apparatus. The advance is effected at a relatively slow rate to assure a suitable depth of wetting of the field area with one movement.

Figures 2, 15:
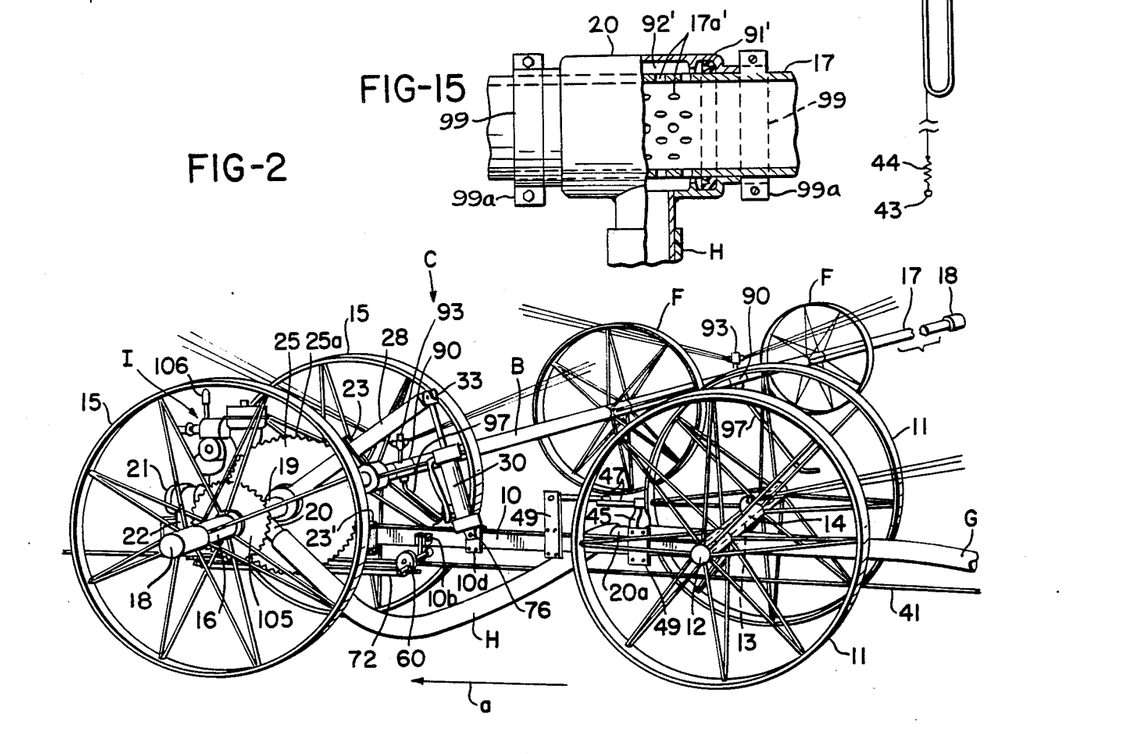
Figure 6:
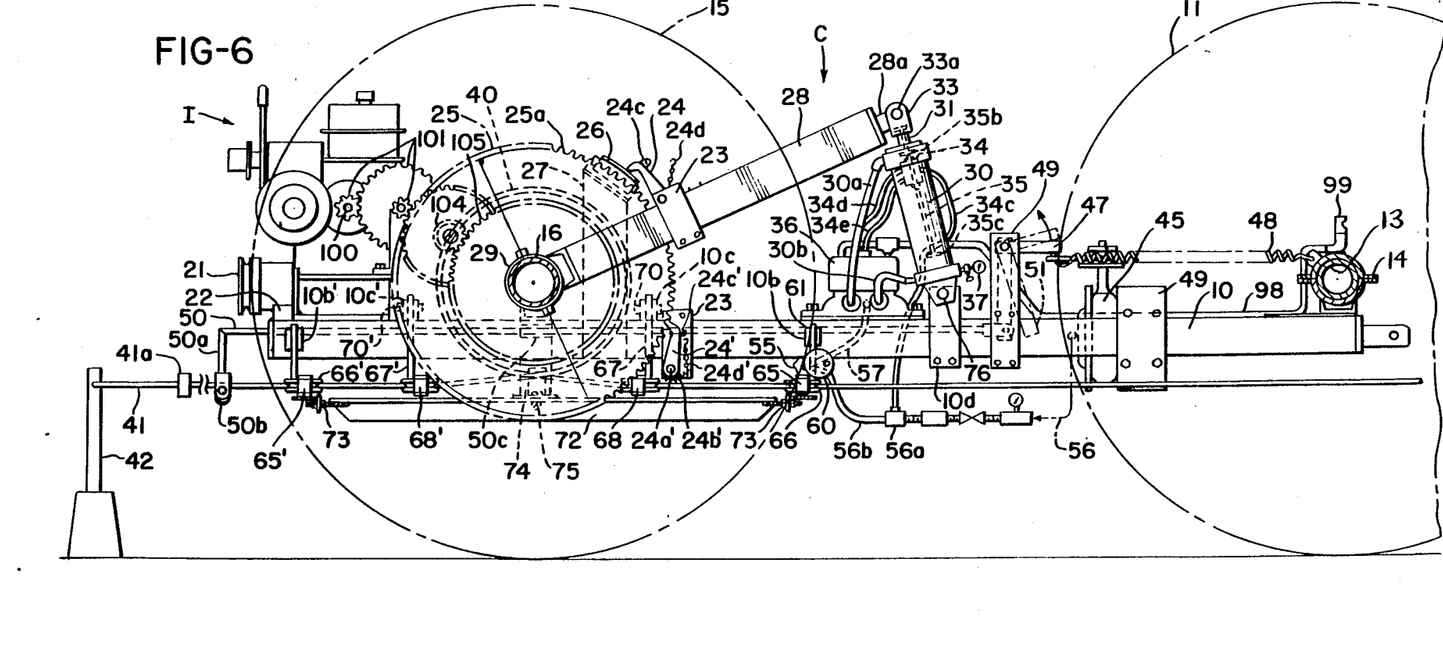
FIG. 6 is a fragmental side view in elevation on the scale of and taken along the line VI—VI of FIG. 5.

Referring to FIGS. 2, 5 and 6, the master drive unit C is shown as a four-wheeled unit whose pair of rear wheels 11 (the arrow a represents the direction of forward movement) are free-turning and mounted by their hubs 12 on a cross-extending axle shaft 13 and secured in place by spacer collars 14. The shaft 13 is rigidly secured on a back end front portion of the main frame 10.

A pair of front wheels 15 are provided with hubs 16 that are bolted on the front shaft 17 which, as noted in FIG. 2, is provided with enclosure caps 18 at its opposite ends to provide a closed-end conduit for water supplied thereto. As shown in FIGS. 5 and 6, a dead end coupling 21 is securely fastened, as by weld metal, on a U-shaped mounting block 22 that extends upwardly from the main frame 10 to provide it with sufficient strength to drag flexible water supply hose G back when the apparatus has reached its final forward position.

Water under suitable pressure is supplied by heavy duty flexible hose G to the main unit C through an end coupling 45a of a main butterfly, shut-off valve 45, see FIG. 5. Water passes from the valve 45 through an opposite end coupling 21a which serves as a one-end mounting for short length of flexible hose H (see FIG. 2). The other or front end of the hose H is adapted to be connected to a tee fitting 20 (see FIGS. 2 and 15) which is mounted in a fluid sealed-off positioning on the hollow shaft 17 to supply water under pressure through sidewise open ports in the shaft and provide a continuous flow therethrough during the forward movement of the apparatus. As shown in FIGS. 2, 5 and 6, and earlier mentioned, closed-off or dead end coupling 21 is mounted on the front end of the frame 10 to receive one end of the flexible hose G for dragging it backwardly along the field when the apparatus is to be returned to an initial or starting position. At this time, the forward end of the hose G is disconnected from an adjacent hydrant, such as A', which is turned-off, and from the back end coupling 45a of the main valve 45.

Figures 7, 8, 9:
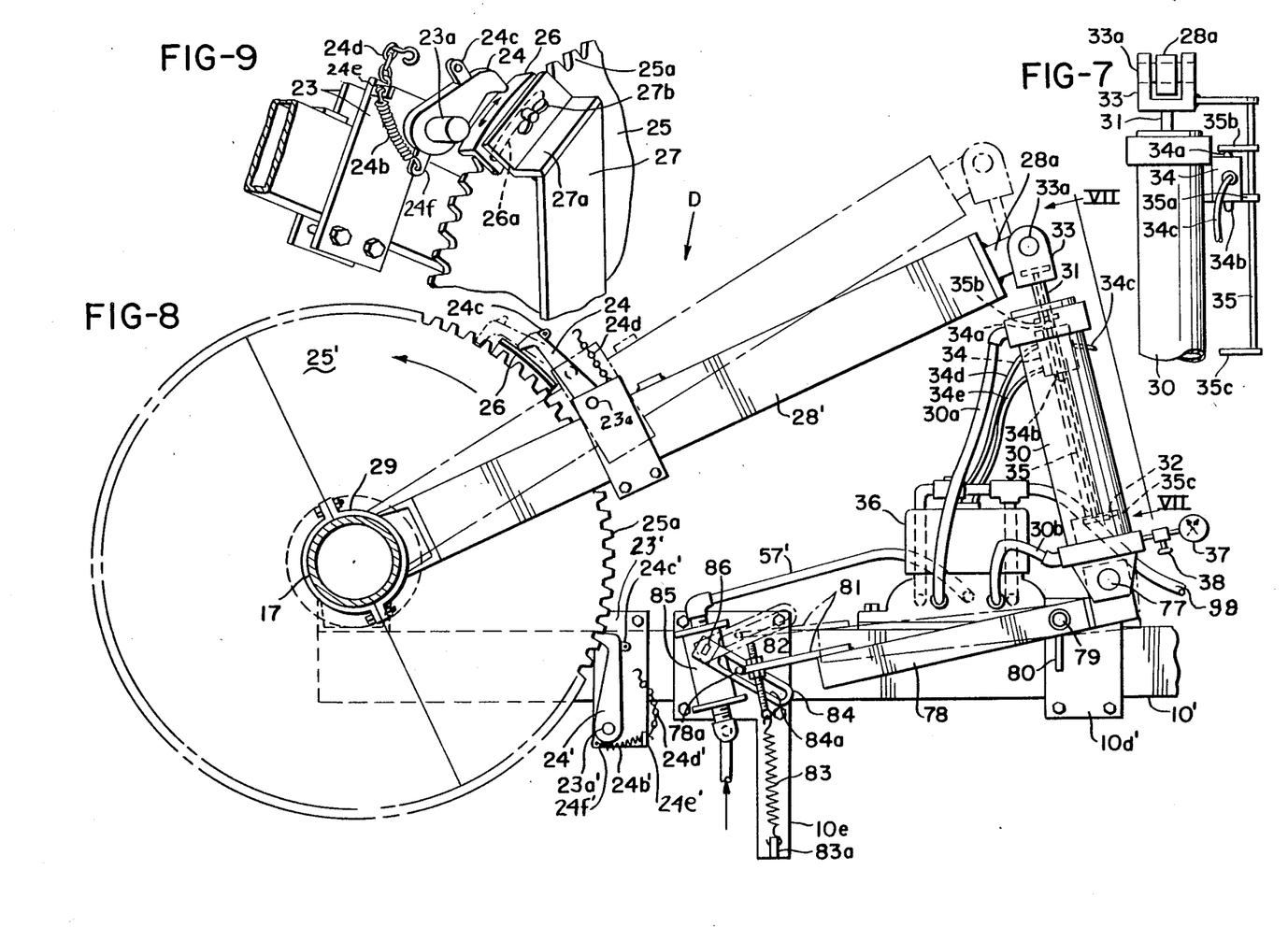
FIG. 7 is an enlarged fragmental view in elevation taken along the line VI—VI of FIG. 8 and showing an upper portion of a positively reciprocated typical hyraulic jack mechanism whose reversing operating is controlled by a poppet valve.
FIG. 8 is a fragmental side view in elevation on the same scale as FIG. 7, and particularly illustrating a jack-actuated, forward drive mechanism for the power and booster units of FIGS. 3 and 4; except for the use of torque-sensitive, valve-control means, the jack, stroke arm and bull gear equipment is substantially the same as that employed for the master drive unit of FIG. 2.
FIG. 9 is a further enlarged fragmental perspective view particularly illustrating a frame-mounted support post or bracket for carrying a slidable, adjustment piece or element which may be used with the drives of the master, power and booster units for adjusting and setting the number of teeth that are energized by an upper dog that is positively actuated by each, upward power stroke of an associated stroking arm.

A relatively slowly timed forward movement of the main frame 10 and its unit C is accomplished through the agency of a reciprocating, positively powered, double-acting hydraulic jack 30 (see particularly FIGS. 6 and 7). The hydraulic jack 30 is employed to forwardly advance the unit C through the agency of a stroking arm 28, an upper or power stroke actuated drive dog, pawl or spring-pressed latching finger element 24, a bull gear 25 and a capstan 40. As shown particularly in FIGS. 6 and 10, anchored cable 41 is reeved about the grooved periphery of the capstan 40 in such a manner that rotation thereof will cause the capstan to advance the unit C forwardly along the cable 41 at a rate depending upon the number of teeth 25a of the bull gear 15 that are engaged with each upward or outer power stroke of piston rod 31 of the jack 30. As shown in FIGS. 8 and 9, the upper or power stroke pawl 24 is pivotally mounted by a side-extending pin 23a within and to extend from bifurcated bracket 23 that is secured at a mid location along the stroking arm 28.

Adjustment of the number of teeth engaged with each upward power stroke of piston 32 and piston rod 31 of the jack 30 is controlled by adjustable, arcuate-shaped, sliding piece or element 26, see particularly FIG. 9. A support or bracket member 27 extends upwardy in a secured relation to the frame 10, and has an offset angle-shaped extension portion 27a that carries a wing nut and bolt assembly 27b for mounting the adjustment plate or element 26 in a secure, set position along its arcuate or sloped adjustment slot 26a. In this manner, as illustrated by the dot and dash lines of FIG. 8, the dog 24 may, for example, be adapted to advance the bull gear 25 by only one or two or three teeth engagement during the upper stroke of the jack.

As shown in FIG. 9, the extending portion of the pin 23a of the pawl 24 is rounded to ride along the outer arcuate surface of the adjustment element 26 for a distance which represents a distance of non-tooth engagement by the pawl 24. A tension spring 24b is connected at one end to a lug 24f on the pawl 24 and, at its other end, to a lug 24e on the mounting bracket assembly 23 to normally urge the pawl towards tooth engagement with respect to the bull gear 25, as well as into riding-over engagement with the adjustment plate or element 26.

To prevent reverse (clockwise) movement of the bull gear 25, a second pawl 24' is pivotally mounted by a pin 23a' on a lower bracket assembly 23' that is directly secured to the main frame 10. The pawl 24' is urged into tooth-engagement by a tension spring 24b' that is secured between a lug 24f' on the pawl 24' and a lug 24e' on the mounting bracket 24'. It will be apparent that the pawl 24' rides over teeth 25a of the bull gear when rotation is being effected counterclockwise by the pawl 24, but that reverse (clockwise) rotation is prevented by latching engagement of the pawl 24' with the teeth 25a.

The construction and mounting of the jack 30 for the master drive unit C, for the power drive unit D and for the booster units E is substantially the same. For this reason, to avoid duplication of description, like parts of the drive units have been given the same reference numerals, but with a single prime affix for the power unit and a double prime affix for the booster units. Where the parts are exactly the same, no prime affixes have been applied.

Again referring to FIGS. 5, 6 and 7, the lower end of the housing of the jack 30 is shown pivotally mounted at 76 on an upright mounting bracket 10d which is secured to extend upwardly from the main frame 10. Water under pressure is supplied alternately to opposite ends of the jack 30 and alternately exhausted therefrom through flexible, end-mounted hose lengths 30a and 30b. Reciprocating movement or reversal of the direction of movement of the piston rod 31 is effected by a poppet valve 34 that is mounted on the side of the housing of the jack to exend sideways therefrom (see FIG. 7). The valve 34 has an upper plunger 34a that is adapted to be engaged and pressed inwardly by a laterally extending finger 35b which is secured on a vertically movable, side-positioned operating rod 35. The rod 35 is secured, as by weld metal, to the side of a clevis 33 carried by the upper or outer end of piston rod 31.

When the piston rod 31 is in its final, innermost, withdrawn position of FIG. 7, the poppet valve 34 is actuated by its plunger 34a to send a reversing signal through flexible hose lines 34d and 34e to a main control valve 36 to reverse the direction of positive forwardly and exhaust flows to the jack 30. At this time, there is a positive fluid flow through line 30b and a negative or return flow through line 30a which is the direct opposite of the flow in accordance with which the piston 32 is moved positively to its "down" and innermost position within the jack housing. When the piston rod 31 has reached its uppermost position, a side-projecting, lower operating finger 35c contacts pressure plunger 34b of the poppet valve 34 to send a signal through lines 34d and 34e to again effect a reverse flow through the lines 30a and 30b, such that the power pressure flow is through line 30a and the exhaust flow is through line 30b. Operating water under pressure is applied to the poppet valve 34 through a flexible hose line 34c which, as shown in FIG. 6, is connected to a tee 56a, a line valve and a gauge to a main input water line 56 from the main water supply end coupling 20a that leads from the main valve 45.

Operating water under pressure is applied to control valve 36 which effects a positive reciprocating movement of the jack 30, through line 57, an alignment flow control valve 55, and a line 56b from the tee 56a (see FIG. 6). Water exhausts from the valve 36 through line 98 which may be connected to a spray nozzle 99 carried on the rear end of the main frame 10 (see FIGS. 5 and 6) and mounted on spacer collar 14. With reference to FIGS. 6 and 8, a pressure gauge 37 is shown connected to the inside of the cylinder of the jack 30 through a manual line closing valve 38.

Figure 12:
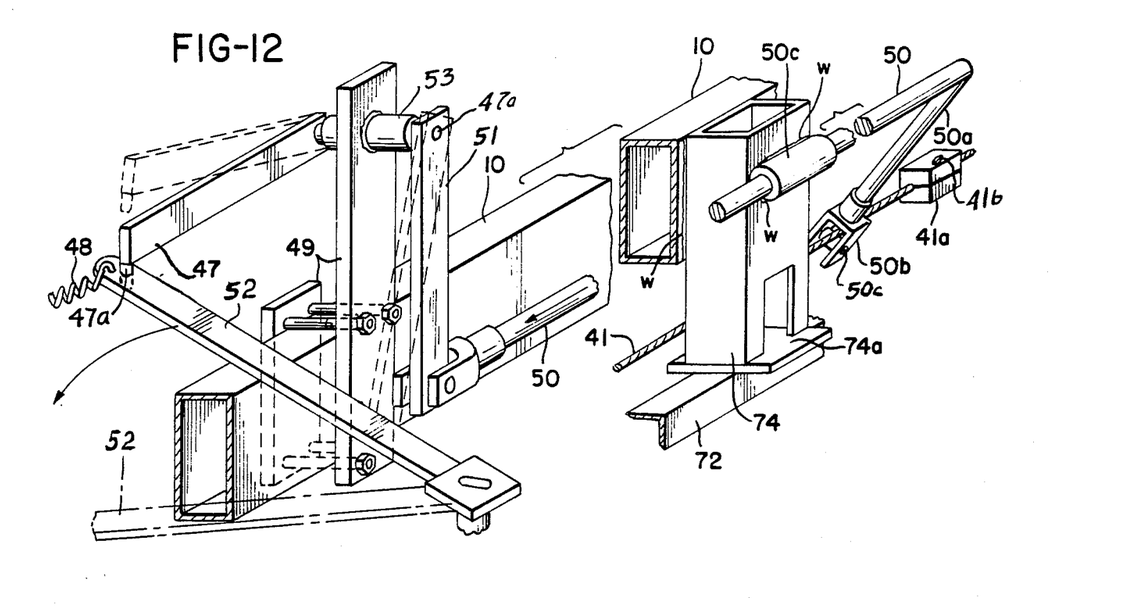
FIG. 12 is an enlarged isometric view of a main valve shut-off lever mechanism of the master drive unit for closing-off the supply of water to the equippage when the operating finger of the system engages a stop along the anchored cable at a desired forward, final stopping position of the apparatus (see also FIG. 1)

Referring particularly to FIGS. 5, 6 and 12, main water supply shut-off valve 45 is controlled in its operation by a lever system which is pivotally mounted on the main frame 10 by a mounting bracket assembly 49 that is secured thereto to project upwardly therefrom. The system has a pair of operating arms 47 and 51 that are secured in a pivotally connected operating relation on an upright, frame mounted bracket 49 by a connecting pin 47a. The pin 47a is rotatably mounted in a sleeve 53 that is secured by weld metal to extend crosswise through the upper end of the bracket 49. Latching arm 47 of the assembly has a down-projecting latching pin 47a which is adapted to engage within a hole in the end of a valve shut-off main lever arm 52 to hold the valve 45 through the agency of the arm 52 in fully open, left hand position of FIG. 5 against the tension of a spring 48 that normally urges it to a closed, dot and dash position of the same Figure.

Again referring to FIG. 12, a longitudinally extending push rod 50 has a pivoted, bifurcated mounting with the lever arm 51 and, at its front end, is slidably mounted within a guide collar 50c that is weld-secured to an upstanding, box-like mounting piece 74 that may be weld-secured to the main frame 10. The foremost front end portion of the operating push rod 50 has a downwardly bent or right-angular extension portion 50a that, at its lower end, carries a bifurcated bracket or clevis 50b having a cross-extending, removable guide pin 50c to receive and bypass the anchor cable 41. During normal forward movement of the apparatus along a crop field, the somewhat thimble-like guide construction 50b will freely slide along the anchored cable 41 until it engages a stop or trip block 41a that is secured on the cable, see also FIG. 1. This engagement causes the rod 50 to move in the direction of the arrow of FIG. 12 to thus raise the latch arm 47 to disengage its latching pin 47a from within a latching hole in the valve operating arm 52. At this time, the spring 48 will then be free to swing the arm 52 to its right hand position of FIG. 5 to fully shut-off flow of water from the valve 45 to all parts of the apparatus.

As shown in FIG. 12, the stop or trip block 41a which is adapted to be mounted on the cable 41 may be of two-part construction secured together by a set screw in a clamping relation on the cable. This enables the stop 41a to be located at any suitable desired position along the anchor cable 41 for effecting an automatic stopping operation.

Figure 10:
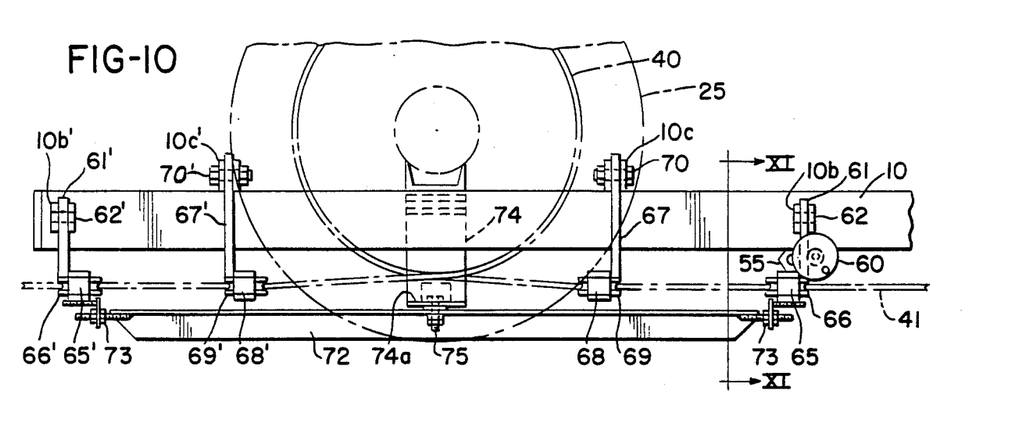
FIG. 10 is a fragmental side view in elevation taken from the lower part of the main frame apparatus of FIGS. 5 and 6 to show the construction and mounting of self-aligning means that may be adjusted for its scope of speed control by a hand wheel; it also shows the relation between the bull gear and the capstan with the reeving of an anchored cable about the capstan.
Figure 11:
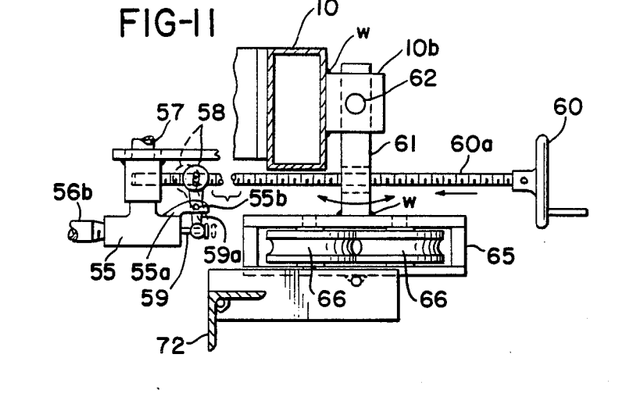
FIG. 11 is a fragmental sectional view on the scale of and taken along the line XI—XI of FIG. 10; in this view, the flow control valve has been rotated 90°0 from FIG. 6 to show it more clearly.

Self-alignment of the forward movement of the master drive unit C is enabled through a mechanism or system particularly illustrated in FIGS. 10 and 11 of the drawings. In this connection, the capstan 40 is mounted with respect to the shaft 17 in such a manner that any misalignment of the main frame 10 with respect to the cable 41 will be registered in the alignment system, but without any danger of the reeving being disturbed. With reference to FIG. 10, a pair of longitudinally spaced-apart support arms 67 and 67' are rigidly secured by bolt and nut assemblies 70, 70' to brackets 10c and 10c' that are mounted on the frame 10 to project downwardly therefrom and carry a pair of pulley boxes 68 and 68' within which are rotatably mounted guide alignment pulleys 69 and 69'. This assures that any misalignment of the machine with respect to the anchored cable 41 does not influence the reeving of it with respect to the capstan 40.

To register off-alignment, a lengthwise-extending, angle-shaped member 72 is shown pivotally mounted by a pivot bolt, nut and washer assembly 75 on a foot 74a of a bracket 74 that extends downwardly from the main frame 10 and also extends upwardly therefrom as a stationary support for the rotating axle shaft 17. Each end of the alignment arm member 72 is connected through adjustable screw and nut means 73, 73' to pulley mounting housings or boxes 65, 65'. Each box is carried on a swing finger 61, 61'; the upper end of each finger is pivotally mounted at 62, 62' in a side-extending bifurcated bracket 10b, 10b' that is secured to and mounted to the main frame 10. Each box 65, 65' carries a pair of cooperating pulleys 66 and 66' which, with their central grooves, define a pass therebetween for the anchor cable 41 (see FIG. 11).

Figure 11A:
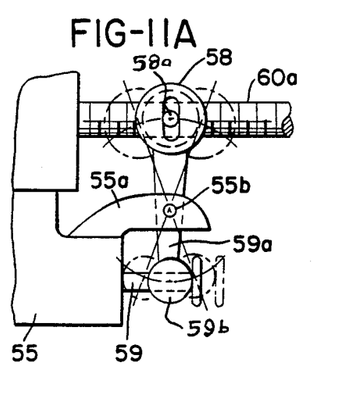
FIG. 11A is an enlarged fragmental view of the flow control valve of FIG. 11.

The right hand end of the alignment assembly in FIG. 10, see the detail of FIG. 11 and the enlarged detail of FIG. 11A, is provided with an adjustment screw 60a which is threadably adjustably mounted to extend through pivot finger 61 to support and adjustably carry a collar 58. The collar 58 at one end has a slot and pin mounting 58a on an extending end of the adjustment screw shaft 60a (see FIG. 11A). The collar 58 also has an integral, side-extending valve operating finger 59a that has a pivot pin 55b which swingably connects the finger 59a on a mounting finger 55a which extends integrally from the housing of an alignment flow control valve 55. Alignment control valve 55 is positioned in the water supply line 56b to adjust the flow of water under pressure through line 57 (see FIGS. 5 and 6) to the control valve 36 for the jack 30. As indicated in FIGS. 11 and 11A, swing of the pivot finger 59a about the pivot point 55b will control the operation of the valve 55 through its connection 59b to valve operating stem 59 to, in one direction, open it to more than its normal setting and in the other direction to move it towards a closed position, depending on whether the misalignment is caused by a lagging of the master drive unit C with respect to the wheel-line, or a more normal condition in which the master drive unit C tends to lead the wheel-line during advance of the apparatus over a crop field area.

Figure 3:
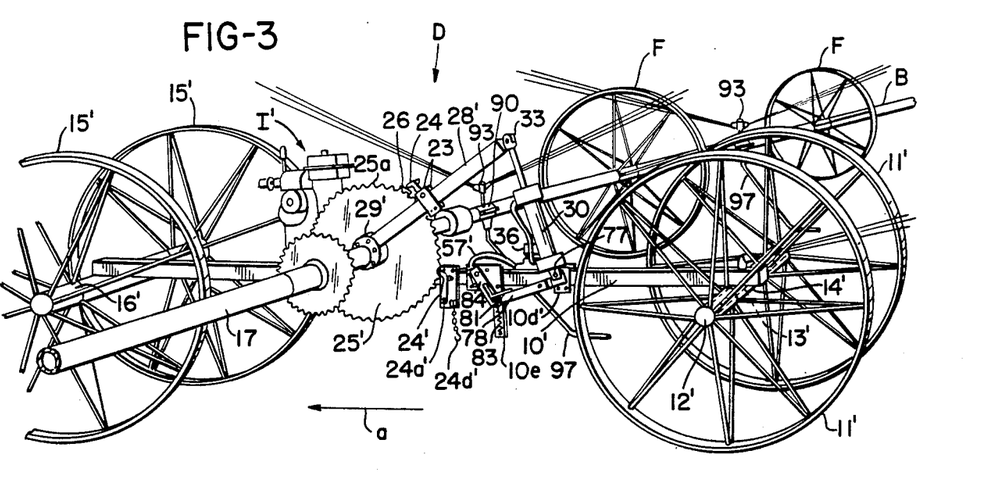
FIG. 3 is a perspective view in elevation on the scale of FIG. 2, illustrating an intermediate power drive unit that may be positioned, as shown in FIG. 1, in an operative mid position along the wheel-line.
Figure 4:
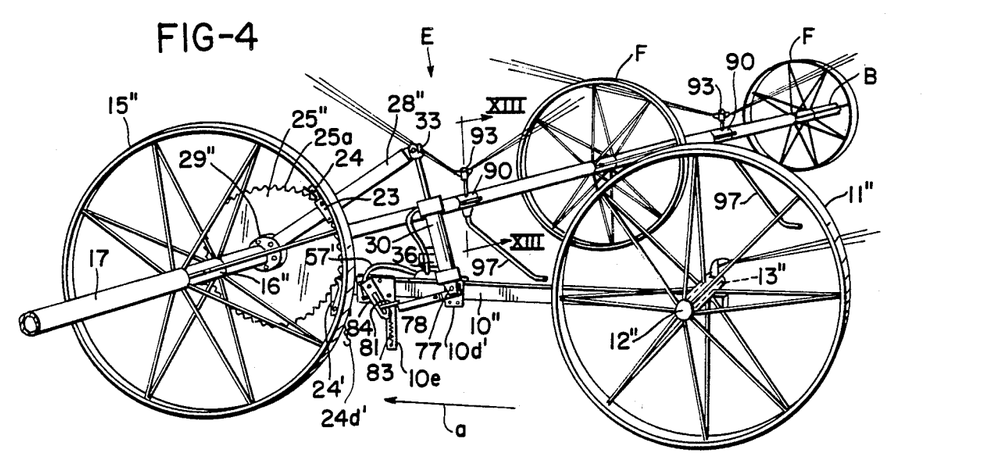
FIG. 4 is a perspective view in elevation on the same scale as FIGS. 2 and 3 and particularly illustrating which may be termed booster units which, as indicated in FIG. 1, may be spaced along the wheel-line to support it and drive it forwardly during the irrigating, forward movement of the apparatus.

Referring particularly to FIGS. 3, 4 and 8, the drive mechanism for the power mover unit D and the booster units E operate in substantially the same manner as previously described in connection with the master drive unit C, except that no capstan is used and the bull gear 25', 25'' is keyed to directly effect rotating movement of the saft 17. However, an additional feature is added to the mechanism of the power drive and booster units which is employed to provide protection to units of the wheel-line from the standpoint of obstructions encountered by it during its forward movement. Such means may be termed torque means, in the sense that it will automatically close-off water pressure application to the respective jacks 30 of such unit when torque resistance to forward advance of such units reaches a preset maximum limit.

As shown particularly in FIG. 8, the jack 30, instead of being directly, pivotally mounted at the lower end of its housing on the main frame of the unit, is securely and non-pivotally mounted by a pin 77 to an upwardly extending foot portion of a fulcrum arm 78. The fulcrum arm 78 is, in turn, mounted on a fixed pivot 79 adjacent the jack on a frame mounted, upwardly projecting bracket 10d'. It will be noted that this bracket has a reinforcing rib 80 through which the pivot pin 79 extends. It will thus be apparent that when the housing of the jack 30 of unit D or E tends to swing during the reciprocating movement of its piston 32, this will cause a corresponding movement of the fulcrum arm 78. When the piston rod 31 of the jack 30 is moved outwardly or upwardly to advance its bull gear 25' or 25", as effected by the upward swing of the stroking arm 28', see the dot and dash position thereof, this causes a corresponding forwardly, downwardly, tilted positioning of the fulcrum arm 78, as indicated by the solid line position of FIG. 8.

An extension piece 81 is weld-secured to the fulcrum arm 78 and, at its foremost end, has a slide pin 78a projecting therefrom to operate within an elongated slot 84a in a valve operating finger 84. The finger 84 is adapted to move between the full line and dot and dash line positions at FIG. 8. The dot and dash line position represents a position in which a pressure cut-off valve 85 may be fully closed through the agency of its pin shaft 86 that securely, non-rotatably carries the forward end of the slotted finger 84 thereon. To adjust the amount of force or torque to which the finger 84 may be subjected before it completely closes the valve 85, the extension piece 81 carries an adjustable screw and nut assembly 82 that extends therethrough and that, at its lower end, is urged downwardly by a tension spring 83. The spring 83 is connected between the lower end of the screw of the assembly 82 and a mounting lug 83a on a downwardly projecting leg of bracket 10e that is bolt-secured to the frame 10' or 10".

The valve 85 has an in-line position the same as the alignment flow control valve 55 of the master unit C (see FIG. 6), in that it is connected between take-off line 56b and the main water pressure supply line 57 that leads to the jack-operating main control valve 36. Adjusting the tension of the spring 83, for example increasing it, will increase the required amount of torque as applied to the jack 30 through the stroking arm 28, before a complete cut-off pressure fluid is accomplished to thus stop forward movement of the particular unit in question.

The pressure setting for the cut-off action may be noted from the pressure gauge 37 to which water may be supplied from the cylinder of the jack when the hand wheel 38 is moved from its normally closed to an open position.

Figure 13:
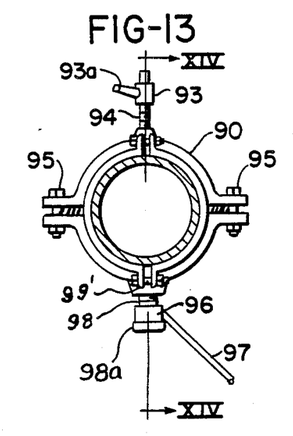
FIG. 13 is an enlarged section taken through the rotating, water-supplying, axle shaft adjacent a spray mount, see line XIII—XIII of FIG. 4.
Figure 14:
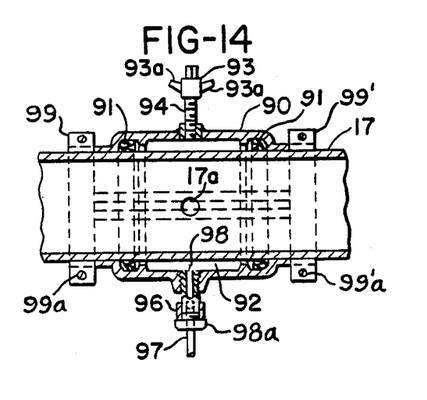

FIGS. 13 and 14 illustrate a typical sprinkler mount such as located along the rotating water supply and wheel-line defining shaft 17. Sprinkler heads 93 are located along suitable spaced-apart length portions of the member 17, usually in an equally spaced relation between the wheel units D and E and supplemental wheels F. Water is supplied to a central chamber 92 through a hole 17a in the wall of the shaft 17. The chamber 92 is defined by a two-part, fluid sealed-off coupling collar or sleeve construction 90 which, at its ends, has a rotatable mounting with respect to the member 17 and is sealed-off by suitable gasket means 91. The central chamber 92, as defined by the sleeve 90, supplies water under pressure through a threaded exit pipe 94 to spray nozzle head 93 which is shown provided with an outwardly extending, upwardly projecting nozzle 93a. Each head 93 may be adapted to rotate on its stem 94 to provide a circular path of water spray in a conventional manner.

To prevent rotatative movement of the sleeve 90 with the shaft 17 during its driving movement, a backwardly extending, angle-shaped, trailing ground-engaging sprag rod 97 is provided.

As shown in FIGS. 13 and 14, the sleeve 90 may be of two-part, sealed-off construction bolted together for easy assembly and disassembly through the agency of bolt and nut assemblies 95, and associated resilient gaskets that extend along flanges of the two halves. The upper end of each trailing rod 97 has a sleeve 96 with a hole therethrough which fits over a pipe nipple 98 that is assembled into a threaded projection that extends from the bottom portion of the sleeve 90. The rod is secured in position with respect thereto by a pipe cap 98a. Sleeve 90 is retained in position on conduit 17 over hole 17a by two split clamps 99, 99' which are secured in position by bolt and nut assemblies 99a.

With reference to FIG. 15, tee fitting 20 may be of somewhat similar construction to the sleeve 90 of FIGS. 13 and 14. It is, however, of one-piece construction and is provided with sealing gaskets 91' that permit rotation of the shaft 17 with respect to the collar. A fluid chamber 92' is defined by the wall of the collar 20 that enables water supplied by the short length hose H to be supplied to the shaft 17 through feed holes 17a' that may be of larger size and smaller in number than shown, if so desired.

It will appear from the previously described construction of the apparatus illustrated in the drawings, the master drive unit C is positively advanced by its jack 30 at a relatively slow rate, dependent upon the number of teeth that are adjustably set to be engaged by the stroking arm 28. Since the bull gear 25 and the capstan 40 of the unit C are integrally secured together, this will produce a corresponding turning movement of the capstan and thus a forward movement of the capstan in its reeving relation with respect to the cable 41. As to the power unit D and the booster units E, advancing movement is accomplished in a similar manner by their respective jacks 30, except that no capstan is provided and their bull gears 25' and 25" are keyed to or secured on the shaft 17 to directly actuate it.

Adjustment of the member 26 of each unit is set by the wing nut 27b (see FIG. 9), in order to assure that each unit C, D and E has the same forward timing for coordinated, aligned advance. Since each jack 30 of the units will have a like return stroke or movement that is assured by positive fluid actuation, uncertain, erratic return action of the jack is obviated. Without such a positive return movement, it is impossible to coordinate the piston movement as is now assured in the present construction.

It is believed to be apparent that the equipment or apparatus of the present invention is so constructed that once its forward operation is initiated, its operation will be substantially fully automatic and that it will not require an attendant to closely follow and become soaked with water. The only manual requirement for transversing the full length of the field in which an anchor cable 41 extends, is for an attendant to open and close valves of the hydrant A, A', etc. and detach the flexible hose G from a given hydrant, such as A of FIG. 1, when the apparatus has additionally reached the forward length extent of the hose, and to then attach the hose to the next hydrant A' and open its valve. At this time, the apparatus will resume its forward advancing movement. Stop 41a may be located at a suitable position along the anchor cable 41 to effect an automatic stoppage of the apparatus at the end of the run. This is accomplished by a fully automatic closing of the main supply valve 45 of the master drive unit C.

The attendant, on noting such stoppage and desiring to return the machine to its starting location, may then approach the hydrant A', shut it off and uncouple the hose G therefrom. He then uncouples the other end of the hose G from the shut-off valve coupling 45a and connects it to the front, dead-end coupling 21. Next, the dogs or pawls 24 and 24' of the units C, D and E are moved back against the tension of their springs 24b and 24b' out of engagement with the bull gears 25, 25' and 25". They are locked in such a position by hooking each chain 24d, 24d' through an adjacent projecting lug 24c, 24c' so as to permit the bull gears to freely move in a clockwise direction.

At this time, the atttendant may start up combustion engines I which are carried by the master unit C and the power drive unit D. It will be noted from FIGS. 5 and 6 that each engine has a gear and drive shaft assembly 101 which is connected through a transmission, for example, in a hydrostatic gear box 102, to drive shaft 103 on which pinion 104 is mounted. As shown in FIG. 5, the pinion 104 is adapted to mesh with the teeth of a gear 105 that is keyed or secured on the conduit and drive shaft 17. A manual operating arm 106 is employed to operate an overriding clutch in the gear box 102 to drive the pinion 104. In this way, the apparatus may be moved backwardly, dragging the flexible hose G to the rear thereof and at a suitable speed, as governed by throttle on each engine I and the ratio of the running gears of the drive train. When the apparatus arrives at its starting position, then the operating lever 106 may be swung to throw the shaft 103 out of operation. The engine I may then be stopped.

We claim:

1. An irrigating mover apparatus for linear movement along a field between opposite length portions thereof having a wheeled frame and a water-carrying revolving axle shaft that mounts at least one wheel of the frame, the improvement which comprises: a bull gear secured on the shaft for rotating it to advance the apparatus along the field, a hydraulic jack operatively mounted on the frame, a stroking arm at one end operatively connected to said jack for actuation thereby, teeth-engaging means operatively carried on said stroking arm and adapted to engage teeth of said bull gear for rotating it, means for supplying water under positive pressure to actuate said jack for advancing the unit along the field, a pivotally mounted fulcrum arm secured to said jack for movement therewith, and pressure cut-off means operated by said fulcrum arm and cooperating with said water supplying means for limiting the maximum torque exerted by said jack in advancing the apparatus.

2. An irrigating apparatus as defined in claim 1 wherein, said pressure cut-off means is a valve, lever means is connected between said fulcrum arm and said pressure cut-off valve for operating said valve to close off the supply of water to said jack when a selected maximum torque is encountered by said stroking arm, and adjustable means is connected to said lever means for controlling the maximum torque setting of said valve.

3. An irrigating mover apparatus for linear movement along a field between opposite length portions thereof which has a wheeled main frame having a hollow rotatable shaft that defines a side-extending sprinkler-carrying and water-supplying irrigating wheel-line, wherein an anchored cable is adapted to extend between spaced length portions of the field to guide the apparatus in its movement therealong, and wherein the apparatus is to be advanced at a selected relative slow rate, the improvement which comprises, a capstan operatively carried on the main frame and reeving with the cable for rotating guided movement therealong, a gear connected to said capstan for rotating it, a hydraulic jack, a stroking arm pivotally mounted at its forward end on the rotatable shaft, said stroking arm having means adapted to engage teeth of said gear for progressively advancing rotation-inducing engagement therewith, said jack having an upwardly and downwardly moving piston connected at one end to a back end of said stroking arm for moving said stroking arm in a capstan-rotating forwardly advancing direction, valve means for positively hydraulically actuating said piston with water under pressure in both its upward and downward movements, and means sensitive to torque exerted on said stroking arm and carried by the main frame for controlling the amount of forwardly advancing rotative movement of said capstan as effected by said stroking arm.

4. An irrigating mover apparatus for linear movement along a field between opposite length portions thereof which has a wheeled main frame unit and a side-extending sprinkler-carrying irrigating wheel-line defined by a hollow water-supplying rotatable shaft, and wherein an anchored cable is adapted to extend between spaced length portions of the field to guide the equipment in an advancing movement between a starting and a forwardly advanced position therealong, the improvement which comprises: a pair of wheels and a capstan operatively carried on the shaft at the main frame unit, said capstan reeving the cable for rotative guided movement therealong, a gear connected to said capstan for rotating it, a hydraulic jack mounted on the main frame and having a piston rod extending therefrom, a stroke arm operatively connected at one end to said piston rod and having means adapted to progressively engage teeth of said gear for inducing rotative advancing movement of said capstan along the cable; a power mover unit positioned along the shaft in a spaced position with respect to said main frame unit and having wheel means and a gear secured on the shaft for rotative movement therewith, a second hydraulic jack pivotally mounted at one end of said power unit and at its other end having a piston rod extending therefrom, a stroke arm operatively connected at one end to said last-mentioned piston rod and having means to progressively engage teeth of said last-mentioned gear to apply rotational force thereto and additional rotational force to the shaft, a fulcrum arm connected to the one end of said second jack for pivotal movement therewith, a water line for supplying water under positive pressure from the shaft to said second jack, and pressure cut-off valve means in said water line operatively connected to said fulcrum arm for controlling maximum torque exerted by said second jack during operative movement of said last-mentioned piston rod.

5. An irrigating mover apparatus for linear movement along a field between opposite length portions thereof having a wheeled frame, and a water-carrying revolving axial shaft that mounts wheel means on the frame, the improvement which comprises: reciprocating hydraulic jack means operatively mounted on the frame, a bull gear operatively mounted on the shaft for advancing the mover unit along the field, a water line operatively connected to said jack means for supplying the water under pressure thereto for actuating it, means in said water line for controlling the operation of said hydraulic jack means, a stroking arm operatively connected to said jack means, and cooperating with said bull gear for rotating said gear, control valve means for applying water under positive pressure to said jack means for reciprocating it positively under water pressure forwardly and backwardly on the frame in such a manner as to actuate said bull gear on its forwawrd stroke, valve means cooperating with movement of said jack means for reversing the flow of water to and from said jack means to effect its reciprocating movement, and additional valve means controlled by torque resistance to movement of said jack means that is actuated to cut-off flow of water under pressure to said jack means when resistance to advancing movement of the mover apparatus approaches a pre-selected value.

6. An irrigating mover apparatus for linear movement along a field between opposite length portions thereof which has a wheeled frame and side-extending sprinkler-carrying irrigating wheel-line, wherein the wheel-line has a hollow water-supplying rotating shaft on which wheel means is mounted, and wherein the apparatus is adapted to be advanced forwardly along and to be retracted backwardly along the field, the improvement which comprises: a bull gear operatively mounted on the shaft for imparting rotating movement thereto, a hydraulic jack pivotally mounted at its lower end on the wheeled frame and at its upper end having a piston rod extending therefrom, a stroking arm operatively connected to said piston rod and having means adapted to progressively engage teeth of said gear for inducing rotational advancing movement thereof as effected by movement of said piston rod to apply forward movement to the shaft, an engine on the frame and having drive means adapted to be moved into and out of an operating relation with the shaft for driving the machine in a retracting direction along the field, a fulcrum arm pivotally mounted on the frame and connected to the lower end of said jack for movement therewith, a water supply line connected between the water-supplying shaft and said jack for supplying water under pressure to said jack, and a pressure cut-off valve positioned in said water supply line and operated by said fulcrum arm for controlling maximum torque exerted by said jack in operating said piston rod to advance the mover apparatus along the field.

7. An irrigating mover apparatus for linear movement along the field between opposite length portions thereof, having a wheeled frame and a water-carrying revolving axial shaft that mounts at least one wheel of the frame, having water spray means connected to the axial shaft for receiving water therefrom and dispersing it on the field, and also having a bull gear mounted on the axial shaft for rotating movement to advance the mover apparatus along the field, the improvement which comprises: a hydraulic jack operatively mounted on the frame, a stroking arm operatively connected to said jack for actuating thereby, said stroking arm having means for engaging teeth of the bull gear for rotating it to advance the mover apparatus along the field, means for supplying water under pressure to the axial shaft and to the water spray means connected thereto, means operatively associated with said jack and sensitive to torque resistance encountered by said jack in advancing the mover apparatus, said last-mentioned means being adapted to positively shut-off supply of water to said jack and to said axial shaft when a pre-selected torque resistance is encountered by said jack.

8. An irrigating mover apparatus for linear movement along a field between opposite length portions thereof having a wheeled frame and a water-carrying revolving axle shaft that mounts at least one wheel of the frame, the improvement which comprises: a bull gear secured on the shaft for rotating it to advance the apparatus along the field, a hydraulic jack operatively mounted on the frame, a stroking arm at one end operatively connected to said jack for actuation thereby, teeth-engaging means operatively carried on said stroking arm and adapted to engage teeth of said bull gear for rotating it, means for supplying water under positive pressure to actuate said jack for advancing the unit along the field, a pivotally mounted fulcrum arm secured to said jack for movement therewith, pressure cut-off means operated by said fulcrum arm and cooperating with said water supplying means for limiting the maximum torque exerted by said jack in advancing the apparatus, said fulcrum arm being connected to a lower end of said jack and pivoted on the wheeled frame, and said fulcrum arm having an extending end operatively connected to said last-mentioned means for moving said last-mentioned means to a closed position when the selected torque resistance is encountered by said jack during its movement.

9. A self-propelled irrigating mover apparatus for linear movement along a field between opposite length portions thereof having a wheeled frame and a water-carrying revolving axial shaft that mounts wheel means on the frame, the improvement which comprises: a bull gear mounted on the frame for rotating movement to advance the mover apparatus along the field, a hydraulic jack operatively mounted on the frame, a stroking arm operatively connected to said jack for actuation thereby, said stroking arm having means for operatively engaging teeth of said bull gear for rotating it to advance the mover apparatus along the field, means for supplying water under positive fluid pressure to actuate said jack, adjustment means cooperating with said teeth engaging means for selecting the number of teeth engaged thereby to control the speed of forward movement of the apparatus, valve means connected to said water supply means for alternately applying energizing water to opposite ends of said jack to positively effect reciprocating action thereof under water pressure, and additional valve means controlled by torque resistance to forward advance of the mover apparatus along the field for positively cutting off the supply of positive fluid pressure to said jack and de-energizing it.

10. A self-propelled irrigating mover apparatus for movement along a field between opposite length portions thereof having a wheeled frame and sprinkler means, the improvement which comprises, a hydraulic jack operatively mounted on the wheeled frame and having stroking arm means actuated thereby to advance the frame along the field, means for supplying water under positive fluid pressure to said jack, valve means connected between said water supplying means and said jack for actuating said jack under water pressure to forwardly advance the mover apparatus along the field, and additional valve means controlled by torque resistance to the forward advance of the mover apparatus along the field as applied to said stroking arm for positively cutting-off the supply of positive fluid pressure to said jack and de-energizing it.

11. A self-propelled irrigating mover apparatus as defined in claim 10 wherein said additional valve means is connected between said water supplying means and said jack actuating valve means.

12. A self-propelled irrigating mover apparatus as defined in claim 11 wherein said jack actuating valve means is connected between said water supplying means and opposite ends of said jack to positively effect reciprocating action of said jack under water pressure.

13. A self-propelled irrigating apparatus as defined in claim 12 wherein, said additional valve means has means for presetting it to a selected maximum torque exerted on said stroking arm for cutting off the supply of positive fluid pressure to said jack means.

14. An irrigating apparatus as defined in claim 10 wherein an engine is mounted on the frame and has means for driving the frame in a reverse direction for returning the apparatus to a starting position.

15. An irrigating apparatus as defined in claim 14 for linear movement with respect to a water-supplying hydrant, a flexible water supplying hose is adapted to be detachably connected at one end to the hydrant, a shut-off valve is carried by the frame, said water supply means has a coupling carried adjacent a rear end of the frame for connecting said shut-off valve to the flexible water supplying hose during forwardly advancing movement of the apparatus, and a second coupling is carried adjacent a front end of the main frame for connecting the flexible water supplying hose thereto after the hose is disconnected from the hydrant and the apparatus is to be returned from a final forward stopping position to a starting position by said engine.

* * * * *